(No Model.)

P. CASEY.
SHAFT LOOP FOR HARNESS.

No. 254,920. Patented Mar. 14, 1882.

WITNESSES:
Francis McArdle
C. Sedgwick

INVENTOR:
P. Casey
BY
Munn & Co
ATTORNEYS.

N. PETERS. Photo-Lithographer. Washington. D. C.

United States Patent Office.

PETER CASEY, OF PROVIDENCE, RHODE ISLAND.

SHAFT-LOOP FOR HARNESS.

SPECIFICATION forming part of Letters Patent No. 254,920, dated March 14, 1882.

Application filed August 3, 1881. (No model.)

*To all whom it may concern:*

Be it known that I, PETER CASEY, of Providence, Providence county, Rhode Island, have invented a new and Improved Shaft-Loop for Harness-Saddles, of which the following is a specification.

The object of my invention is to provide a new and improved shaft-loop for harness-saddles which is so constructed that the shafts of the wagon or cart can pass and slide through it very easily, thus preventing the loops from chafing the sides of the horse when the wagon or cart receives shocks and jolts, and at the same time my shaft-loop is more durable than those in use heretofore.

The invention consists in a shaft-loop provided at its upper end with a rigid buckle-frame and a pivoted buckle-tongue, whereas its lower end is provided with a series of apertures, in which balls are placed and held therein by a metal plate fastened on the outer or underside of the loop. These balls project partly from the inner surface of the loop and serve as an anti-friction bearing for the shaft.

Figure 1:
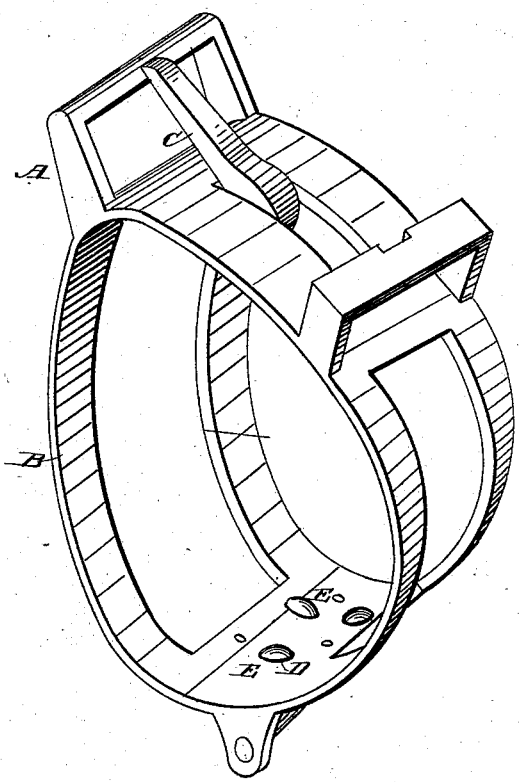
Figure 2:
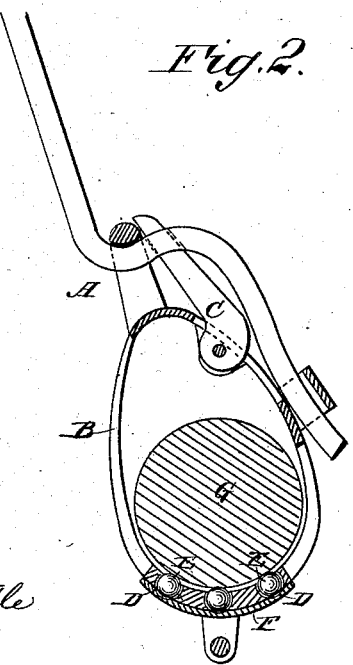

In the accompanying drawings, Figure 1 is a perspective view of my improved shaft-loop. Fig. 2 is a cross-sectional elevation of the same and of the shaft therein.

Similar letters of reference indicate corresponding parts.

A buckle-frame, A, is rigidly attached to the upper end of the shaft-loop B of a harness-saddle, and the tongue C of the buckle is pivoted to the side of the loop B.

Heretofore the supporting-buckles of shaft-loops have been pivoted to the loop and became worn off in a very short time, which is not and cannot be the case in my improved shaft loop.

The lower part of the loop B is provided with a series of recesses or apertures, D D, into which balls E are placed, which are held in these recesses or apertures by a plate, F, fastened on the under outer side of the shaft-loop. These balls E project slightly from the inner surface of the loop B, and the shaft G passed through the loop will rest on these balls, which will revolve in the apertures or recesses if the shaft moves to and fro in the loop, as it does when the wagon or cart passes over uneven ground. As the balls E on which the shaft rests fit loosely in their recesses or apertures, the jolting movement of the shafts cannot be transmitted to the shaft-loops, which remain stationary and will not chafe the sides of the horse.

By providing the shaft-loop with an anti-friction bearing for the shafts all the defects of the ordinary shaft-loop are avoided, for if there is not sufficient friction between the shafts and the loop to move the latter with the former, chafing the animal will be avoided. As I have provided a rolling bearing for the shafts, the buckle of the loop B need not be pivoted, and is stronger if made rigid, as described.

Having thus described my invention, I claim as new and desire to secure by Letters Patent—

1. As an improved article of manufacture, a shaft-loop provided with a rigid buckle-frame at its upper end, a tongue pivoted in its side, and a series of balls in its lower part, substantially as herein shown and described.

2. The combination, with the shaft-loop B, of the balls E, loosely held in bearings in the lower portion of the said loop, substantially as and for the purpose set forth.

3. The combination, with the shaft-loop B, provided with apertures D, of the balls E and the plate F, substantially as herein shown and described, and for the purpose set forth.

PETER CASEY.

Witnesses:
OSCAR F. GUNZ,
C. SEDGWICK.